Figure 1:
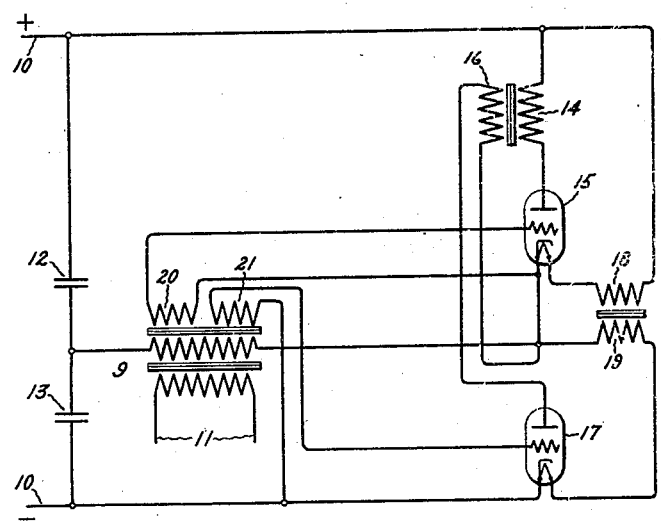

Dec. 22, 1931.  C. A. SABBAH  1,838,001

ELECTRIC POWER CONVERTING APPARATUS

Filed March 30, 1931

Inventor:
Camil A. Sabbah,
by Charles E. Tullar
His Attorney.

Patented Dec. 22, 1931

1,838,001

UNITED STATES PATENT OFFICE

CAMIL A. SABBAH, OF SCHENECTADY, NEW YORK, ASSIGNOR TO GENERAL ELECTRIC COMPANY, A CORPORATION OF NEW YORK

ELECTRIC POWER CONVERTING APPARATUS

Application filed March 30, 1931. Serial No. 526,337.

My invention relates to electric power converting apparatus, and more particularly to such apparatus utilizing electric valves for transmitting energy between direct and alternating current circuits.

Heretofore there have been provided numerous arrangements including electric valves for transmitting energy between direct and alternating current circuits. In certain of these arrangements, which have come to be known in the art as series converters, a plurality of electric valves are connected in a series circuit across the direct current circuit. It often becomes desirable in connection with such power converting apparatus to utilize electric valves of the hot cathode type in which the cathode heater either comprises the cathode itself or is an independent heater but electrically connected to the cathode. Such an arrangement avoids certain manufacturing difficulties encountered in the construction of insulated cathode heaters. Since the cathodes of the several electric valves of a series type converter are at different electrical potentials, it becomes necessary either to supply an auxiliary source of heating current for each cathode heater, such for example as a battery, or to provide some special circuit arrangement for energizing the heaters. It has been found that, for the most satisfactory operation of the apparatus, it is necessary to prevent short circuiting of the alternating component of potential appearing in the circuit by the heater circuits. The disadvantages in the use of batteries for cathode heating of electric valves are too well known to require discussion.

It is an object of my invention therefore to provide an improved electric power converting apparatus of the series converter type utilizing electric valves in which non-insulated cathode heaters may be energized directly from the direct current circuit of the apparatus.

It is another object of my invention to provide an improved electric power converting apparatus of the series converter type utilizing electric valves in which the cathode heaters of the electric valves are connected in a series circuit energized from the direct current circuit and in which no component of alternating potential will be short circuited.

In accordance with my invention a series type converter is equipped with electric valves of the non-insulated cathode heater type. This series converter may be of any of the several modifications well known in the art, such for example, as are illustrated in my copending application Serial No. 376,828, filed July 8, 1929, and assigned to the same assignee as the present application, or United States Letters Patent No. 1,752,247, granted March 25, 1930, upon the application of Allen S. Fitz Gerald. Two cathode heaters are connected in series across the direct current circuit of the converter and an inductive winding is connected in series with each heater. These inductive windings are so coupled that the flux due to the direct current components of heating current neutralize each other while the full alternating components of potential appearing in the heater circuits are absorbed by the inductive windings.

For a better understanding of my invention, together with other and further objects thereof, reference is had to the following description taken in connection with the accompanying drawings, and its scope will be pointed out in the appended claims. Fig. 1 of the drawings illustrates my invention as applied to a straight series type inverter utilizing non-insulated hot cathode electric valves while Fig. 2 illustrates its application to a cross connected series inverter.

Referring now to Fig. 1 of the drawings, I have illustrated my invention as applied to a straight series type inverter, such for example, as referred to in my above mentioned copending application, for transmitting energy from a direct current supply circuit 10 to an alternating current circuit 11. This inverter comprises two series circuits connected in parallel across the direct current circuit 10, the first of these circuits consisting of capacitors 12 and 13 and the second of a reactor 14 and electric valve 15, and a reactor 16 and electric valve 17, respectively, reactors 14 and 16 being inductively coupled as illustrated. The primary winding of the output transformer 9 is connected between the midpoints of these two series circuits. The electric valves 15 and 17 may be of any of the several types well known in the art although I prefer to use valves of the vapor electric discharge type. These valves are each provided with an anode, a control grid, a cathode, and a cathode heater which is connected directly to the cathode, thus simplifying the mechanical construction. The cathode heaters of the valves 15 and 17 are energized from their respective halves, or other symmetrical portions, of the series circuit including the valves 15 and 17. In order to prevent a short circuiting of the alternating components of potential appearing across these halves of the series circuit, there is included in the circuits of the cathode heaters of the valves 15 and 17 inductive windings 18 and 19, respectively, which are inductively coupled and connected in such a way that the direct current components flowing through these reactors neutralize each other while the full magnetizing impedance of the reactors opposes the flow of any alternating current component. The control grids of the valves 15 and 17 may be excited from an independent source of alternating current of the desired frequency or directly from some portion of the power circuit of the apparatus, such, for example, as by means of the tertiary windings 20 and 21 of the transformer 9.

A detailed description of the operation of the above described apparatus will be found in my copending application referred to above. In brief, one of the electric valves, for example, valve 15, is conductive for one half cycle and during this half cycle capacitor 12, which has been charged during the previous half cycle, discharges while capacitor 13 is charged through electric valve 15. During the succeeding half cycle, electric valve 17 becomes conductive, capacitor 13 discharges therethrough, capacitor 12 becomes charged through valve 17, the charging and discharging current of the capacitors 12 and 13 flowing in opposite direction through the primary winding of the transformer 9 during successive half cycles. The reactors 14 and 16 serve to commutate the current between the valves 15 and 17 in case the apparatus is operating slightly above its resonant frequency; that is, when one of the valves is made conductive before current has completely died down in the other valve, the sudden building up of current in the first valve induces a potential in the reactor associated with the other valve which interrupts the current in that valve, as is well understood by those skilled in the art. It will be seen that the cathode heater of the valve 15 is energized with the potential appearing across reactor 14 and electric valve 15 while the cathode heater of the valve 17 is energized with the potential appearing across reactor 16 and electric valve 17. Each of these potentials is made up of a uni-directional component superimposed upon an alternating component. The uni-directional component is substantially half the potential of the direct current circuit 10 while the alternating component may have a maximum value nearly twice that of the potential of the direct current circuit 10 so that the cathode heater tends to draw substantially twice as much alternating current as direct current. In other words, the cathode heaters provide a relatively low impedance path in parallel to reactor 14 and electric valve 15, and reactor 16 and electric valve 17, respectively. It has been found that such an arrangement alone affects the operation of the apparatus disadvantageously. However, by including in the cathode heater circuits of the valves 15 and 17, respectively inductively coupled windings 18 and 19, and so connecting them that the direct current components neutralize each other, it has been found that this disturbing effect is eliminated. From the connections illustrated it will be seen that the direct current components will flow through the reactors 18 and 19 in opposite direction while the alternating current components will flow in reactors 18 and 19 in the same direction, thus being limited by the full magnetizing impedance of the reactors.

Figure 2:
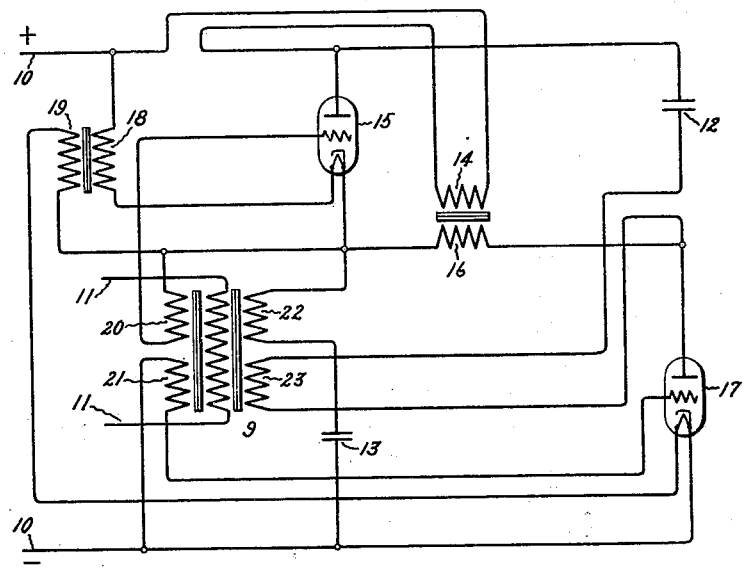

In Fig. 2 there is illustrated a rearrangement of the apparatus shown in Fig. 1 into the so-called cross connected series inverter. The circuit elements are identical each for each with the exception that the transformer 9 is provided with two primary windings which are connected in the two series circuits made up of electric valve 15 and capacitor 13, and capacitor 12 and electric valve 17 respectively. As in the previous arrangement, during one half cycle when electric valve 15 is conductive, capacitor 13 is charged therethrough while capacitor 12 discharges, the primary windings 22 and 23 being so connected that the charging current of the capacitor 13 and the discharging current of the capacitor 12 flow in the same direction with respect to the secondary winding of the transformer 9. During the succeeding half cycle, capacitor 12 is charged through electric valve 17 while capacitor 13 discharges therethrough. As in the previous arrangement the cathode heaters of the valves 15 and 17 are energized with the potential appearing across their associated reactors 14 and 16, respectively, and valves 15 and 17. The circuits of the cathode heaters include reactors 18 and 19 inductively coupled and connected as in the arrangement illustrated in Fig. 1 to eliminate substantially any flow of alternating current in the heater circuit.

While I have described what I at present consider the preferred embodiment of my invention, it will be obvious to those skilled in the art that various changes and modifications may be made without departing from my invention, and I therefore aim in the appended claims to cover all such changes and modifications as fall within the true spirit and scope of my invention.

What I claim as new and desire to secure by Letters Patent of the United States is:—

1. In an electric power converting apparatus for transmitting energy between direct and alternating current circuits including a plurality of series connected electric valves provided with non-insulated cathode heaters, circuits for heating said heaters from said direct current circuit, and means for substantially suppressing the flow of alternating current in said heater circuits.

2. In an electric power converting apparatus for transmitting energy between direct and alternating current circuits including a plurality of series connected electric valves provided with non-insulated cathode heaters, circuits for heating said heaters from said direct current circuit, an inductive winding, and means for subjecting any alternating current components in said heater to the magnetizing impedance of said winding.

3. In an electric power converting apparatus for transmitting energy between direct and alternating current circuit including a pair of series connected electric valves provided with non-insulated cathode heaters, circuits for heating said heaters from said direct current circuit, and an inductive winding in each heater circuit, said inductive windings being magnetically coupled and so connected that any alternating components of current in said heater circuits are subject to the magnetizing impedance of said windings.

4. In an electric power converting apparatus for transmitting energy between direct and alternating current circuits including a series circuit across said direct current circuit containing a pair of electric valves provided with non-insulated cathode heaters, circuits for energizing said heaters from symmetrical portions of said series circuit, and means for substantially suppressing the flow of alternating current in said heater circuits.

5. In combination, a direct current circuit, an alternating current circuit, apparatus for transmitting energy therebetween comprising a series circuit connected across said direct current circuit and including a plurality of electric valves provided with non-insulated cathode heaters, a capacitor, a capacitor charging circuit including one of said valves, and a capacitor discharging circuit including another of said valves, said charging and discharging circuits being common to said alternating current circuit, circuits for heating said heaters from said direct current circuit, and means for substantially suppressing the flow of alternating current in said heater circuits.

In witness whereof, I have hereunto set my hand.

CAMIL A. SABBAH.